United States Patent [19]

McDougal

[11] Patent Number: 4,528,354

[45] Date of Patent: Jul. 9, 1985

[54] PROCESS AND COMPOSITION FOR THE MANUFACTURE OF PRODUCTS FROM SILICONE RUBBER

[76] Inventor: John R. McDougal, 7043 Strout Rd., Morrow, Ohio 45152

[21] Appl. No.: 603,765

[22] Filed: Apr. 25, 1984

[51] Int. Cl.[3] .......... C08G 77/04

[52] U.S. Cl. .......... 528/33; 528/34; 528/901; 525/474; 264/328.6; 264/236; 264/347; 264/209.6; 264/331.11

[58] Field of Search .......... 264/328.6, 236, 347, 264/209.6, 331.11; 528/901, 33, 34; 525/474

[56] References Cited

U.S. PATENT DOCUMENTS

| | | | |
|---|---|---|---|
| 3,070,559 | 12/1982 | Nitzsche et al. | 524/588 |
| 4,293,677 | 10/1981 | Imai | 528/901 |
| 4,329,275 | 5/1982 | Hatanaka et al. | 528/24 |
| 4,335,035 | 6/1982 | Hatanaka et al. | 528/24 |
| 4,375,523 | 3/1983 | Hatanaka et al. | 528/24 |

*Primary Examiner*—Melvyn I. Marquis

*Attorney, Agent, or Firm*—Pearne, Gordon, Sessions, McCoy, Granger & Tilberry

[57] ABSTRACT

A process is disclosed for the manufacture of products from silicone rubber stock which includes forming a mixture of silicone rubber components, such as silicone monomers, oligomers, or polymers, microcapsules containing a cross-linking agent for silicone rubber components and, optionally, one or more additives. The cross-linking agent is maintained in microcapsules isolated from the silicone rubber components until a predetermined temperature and pressure are reached. The mixture is flowed into a mold cavity under heat and pressure prior to any significant cross-linking agent-induced cross-linking during a first portion of the molding cycle. During a second portion of the molding cycle, the cross-linking agent is released to effect substantially all cross-linking agent-induced cross-linking. The cured mixture is removed from the mold cavity to provide a silicone rubber product.

9 Claims, 3 Drawing Figures

PROCESS AND COMPOSITION FOR THE MANUFACTURE OF PRODUCTS FROM SILICONE RUBBER

BACKGROUND OF THE INVENTION

This invention relates to a process for the manufacture of products from silicone rubber stock and, more particularly, from one-part silicone rubber stock. Products manufactured from silicone rubber stock are used, for example, in the automotive industry and the biomedical arts.

Industry currently employs primarily two types of silicone rubbers: heat-curing silicone rubbers and room-temperature vulcanizing (RTV) silicone rubbers. For the heat-curing silicone rubbers, the compounds are cured by heating with a free-radical generator, such as an organic peroxide, which acts as a cross-linking agent. These compounds are processed by molding (injection, transfer, or compression), extruding, calendering, dispersion, or sponging. The RTV silicone rubbers are cured either by condensation or by an addition reaction. In the condensation cure, either a one-part or two-part system can be used.

An example of a one-part silicone rubber stock is described in U.S. Pat. No. 3,070,559 to Nitzsche and Wick. This composition consists of organosiloxane components (i.e., organosiloxane monomers), fillers, cross-linking agents consisting of alkyoxy or aryloxysilanes or their condensation products, and Lewis acid or base catalysts. This patent teaches that either the cross-linking agent or catalyst, or both, can be isolated by absorption in an aluminum silicate molecular cage. It is necessary to provide a hydrophobic coating on the aluminum silicate after the cross-linking agent and catalyst have been absorbed. This acts to inhibit vulcanization brought about by water vapor in the air.

The two-part systems are composed of silicone rubber components (or silicone monomers) mixed with fillers and ethyl silicate. Just before using the material, the second part, a metal soap curing agent, is stirred in. This curing agent could, for example, consist of dibutyl tin dilaurate or tin octoate. The resultant reaction which causes the elimination of ethyl alcohol initiates curing. *Modern Plastics Encyclopedia* 1981–1982, Vol. 58, No. 10A, pp. 108–110.

The present invention is illustrated for use with heat-curing silicone rubber systems; however, it may also be applied to RTV silicone rubber systems.

As presently known, most heat-curing silicone rubber stock is made up intermittently in large batches according to production demand. After mixing, they are stored under controlled conditions until they are used. Because the cross-linking agent is mixed into the stock compound, the stock is partially cured and gelled during mixing, which increases its viscosity. It continues as well to cure slowly during storage. Thus, after one or two months in storage, it becomes too cured or viscous to use, and must be discarded. These stocks or compounds, therefore, have limited shelf life, depending upon storage conditions.

On the other hand, the stock may be mixed up on a smaller demand basis. While this solves the problem of viscosity and of product waste, it requires the presence of a formulating supervisor and the additional step of mixing before a production run.

In the course of mixing the silicone rubber systems, the temperature of the stock increases because of kinetic energy transferred to the stock and because the reaction is exothermic. The intensity and length of the mixing process must be restricted to avoid excessive premature cure, since the additional heat causes the reaction between the available cross-linking agent and the silicone components. Water jacket cooling techniques may be employed to inhibit this reaction, but the mixing operation as currently practiced remains an art employing variations of elastomeric components and cross-linking agents, as well as use of promoters, accelerators, and inhibitors. The accelerators used may be, for example, heavy metal salts, metal soaps such as cobalt naphthenate, manganese octenate, tertiary amines such as dimethylanilines, mercaptanes, and azo compounds.

Often, the mixing process with these known stocks must be terminated without regard for the uniformity of distribution. Thus, the problem occurs that because of the restricted conditions under which the stocks are mixed, the cross-linking agent, elastomers, and other additives are not completely distributed throughout the mixture. This frequently occurs if the temperature of the mixture increases too much and the mixing operation has to be cut short before the additives are completely mixed in.

For products molded from silicone rubber stock, there have always been problems in filling the molds completely and obtaining suitable surface finish of the molded parts. Particularly for the medical field, products frequently have to be hand-finished, which is both expensive and time-consuming.

Organic resin compositions containing encapsulated catalysts are known. U.S. Pat. No. 4,362,566 to Hinterwalder, for example, teaches the use of encapsulation to inhibit the reaction in a polymeric system. For the most part, such capsules are intended to shatter with the application of mechanical forces, and in particular mechanical shearing forces. This would prove a significant problem during the mixing stage of the present system.

The practices for microencapsulation of materials are well known, and have been well known since the end of World War II. Reference is made to "Microcapsule Processing and Technology," Asagi Kondo, edited and revised by J. Wade Van Valkenberg, Marcel Decker, Inc., New York, N.Y. (1979), and "Capsule Technology in Microencapsulation," Noise Data, Parkridge, N.J. (1972). The cross-linking agents used are usually organic peroxides in the form of volatile liquids or solids dissolved in a solvent. These cross-linking agents are both toxic and difficult to handle.

SUMMARY OF THE INVENTION

I have discovered that cross-linking agents for silicone rubber stocks can be encapsulated in rigid microcapsules designed to burst under thermodynamically controlled conditions. This can be used in a new process for the manufacture of silicone rubber products. This process includes the steps of forming a mixture of silicone rubber components, microcapsules containing a cross-linking agent for the silicone rubber components, and one or more additives; maintaining substantially all of the cross-linking agent in the microcapsules isolated from the silicone rubber components until a predetermined temperature and pressure within the capsules are reached; flowing the mixture to fill a mold cavity with the mixture prior to any significant cross-linking agent-induced cross-linking during a first portion of the molding cycle; releasing the cross-linking agent from the microcapsules at this predetermined temperature and pressure to terminate the first portion of the molding cycle and commence a second portion of the molding cycle; effecting substantially all cross-linking agent-induced cross-linking during this second portion of the molding cycle; and removing the cured mixture from the mold cavity to provide the silicone rubber product.

This invention is an advance in the manufacture of one part silicone rubber or elastomer stocks for use in the manufacture of molded products. The silicone rubber stocks include silicone rubber reaction components (such as a silane or siloxane monomer, oligomers, and polymers), fillers and encapsulated cross-linking agents (such as an organic peroxide). These stocks can be mixed on a large batch basis. The invention eliminates premature cure during mixing and storage. This enables more thorough mixing and results in a better product by enabling a substantially uniform integration or mixture of the ingredients. It also substantially lengthens the shelf life of the silicone system and thereby effects mixing economies.

The microcapsules are substantially inert to the other ingredients of the silicone rubber stock, and serve to isolate the cross-linking agents from reaction with these silicone rubber components. The capsule walls are strong enough to retain their integrity throughout the mixing process, but sufficiently weak to rupture and release the cross-linking agent at predetermined molding temperatures and internal capsule pressures. The internal vapor pressure of encapsulated material at the molding temperatures is believed to rupture the capsules, releasing the cross-linking agent.

The use of thermosetting resins, such as phenolic resins, to encapsulate organic peroxide cross-linking agent has been found to provide satisfactory reaction isolation and structural integrity in silicone rubber stock. The physical characteristics of the microcapsule are matched with the characteristic of the particular cross-linking agent and silicone rubber components to provide capsule rupture and release of the cross-linking agent at a temperature close to the molding temperature of the system.

The cross-linking agent remains isolated from the silicone rubber components until the manufacturer chooses to initiate the polymerization reaction by subjecting the stock to the proper temperature to rupture the capsules and release the cross-linking agent. The invention simplifies the art of choosing and mixing the ingredients of the silicone rubber stock by eliminating the need to chemically control the rate of reaction using accelerators and inhibitors.

Also, by providing more control over the polymerization or vulcanization reaction, the silicone rubber stocks according to the new invention have improved molding properties and elongation characteristics. The invention also permits molding at lower pressure and results in less flash.

Another advantage which the invention provides is that the reactive and often toxic cross-linking agents are isolated. These compounds are often volatile and vaporize easily. Vaporization of the cross-linking agent during mixing and storage is greatly inhibited and safety in handling the premolded composition is increased. Since the cross-linking agents are contained within the premolded composition, the invention enables the use of cross-linking agents which might otherwise be unsatisfactory (i.e., because of volatility, odor, or toxicity).

The invention can be applied for various manufacturing techniques, including injection molding, compression, and transfer molding and extrusion.

DESCRIPTION OF THE PREFERRED EMBODIMENT

Figure 1:
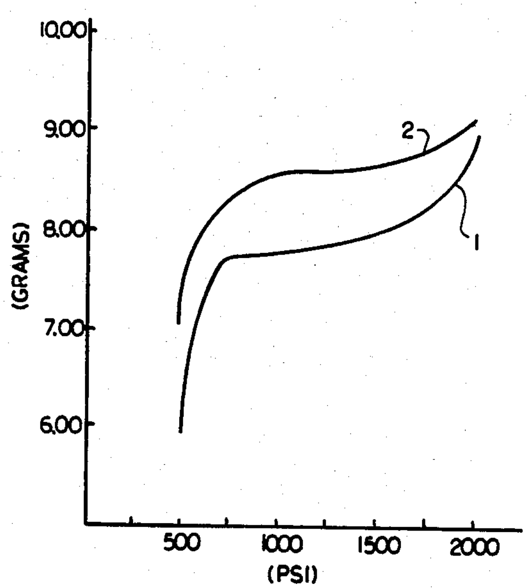
FIG. 1 is a graph showing the spiral weight of the silicone rubber composite versus the injection pressure, both with and without encapsulated cross-linking encapsulation, in accordance with the invention.

The present invention relates to any of the conventional silicone rubber stocks used to make molded or extruded products, and particularly one-part silicone rubber stocks. The ingredients of the silicone rubber stock include silicone rubber components (comprising silane or siloxane monomers, oligomers or polymers), a free radical cross-linking agent which decomposes with heat to provide free radicals (such as the organic peroxides), and various types of fillers. In addition, accelerators and inhibitors can be used to control the polymerization reaction, although the present invention eliminates the need for these. The products are typically the condensation product of the mixture of the silicone rubber components and the cross-linking agent.

Various kinds of fillers are added, such as the metal oxides, including specifically titanium dioxide and iron oxide, and various natural and manufactured silicones. Other additives, such as ultraviolet absorbers, flame retardants, antioxidants, mold release agents, coloring agents, reinforcing fibers and the like, are all well known in the art.

Additional description of silicone rubber stocks appears in U.S. Pat. No. 3,070,559 to Nitzsche and Wick.

In accordance with the present invention, the cross-linking agent is encapsulated in microcapsules. The microcapsules of this invention may range in size from 5 to 200 microns. The most satisfactory results are achieved with microcapsules ranging from 10 to 50 microns in diameter or size. Encapsulating materials are preferably phenol formaldehyde resins, with physical characteristics, particularly wall thickness and rupture strength, designed to withstand the internal vapor pressure of the cross-linking agent up to the pressures developed at the molding temperatures of the silicone rubber components. At the molding temperatures, the capsules rupture and release the cross-linking agent. At the same time, the capsules are small enough and strong enough so that they can withstand the intensive mixing required without releasing the cross-linking agent.

The encapsulating resin and wall thickness of the capsules are selected to provide rupture at the desired temperature and pressure. This characteristic is known as rupture strength. It should be obvious that the rupture strength of the resin varies with the resin material and composition. Likewise, thin capsule walls rupture more easily than thick capsule walls. In accordance with the invention, these factors are correlated with vapor pressure generated within the capsules to provide rupture at the desired temperature.

Molding or extruding temperatures are typically in the order of 300° F. to 370° F., and more particularly between 320° F. and 350° F., depending on the cross-linking agent. Satisfactory rupture temperatures range from about 50° F. and preferably from about 10° F. below the molding temperature, to about the molding temperature, or from about 15% and preferably from about 5% below the molding temperature, to about the molding temperature. The term "molding temperature" means the temperature at the inside surface of the mold which forms the finished surface as measured by a pyrometer or the like.

Molding or extruding pressures typically range from 500 to 2500 psi, and more particularly between 750 and 2000 psi. Mold pressures are measured at the mold gate at the well or loading chamber, or at other similar locations.

The internal vapor pressure necessary for rupturing the microcapsules is developed upon heating of the encapsulated material, which must include a liquid phase or the equivalent thereof. The liquid phase may comprise the cross-linking agent, a solvent for the cross-linking agent (if the cross-linking agent is solid), or diluent for the cross-linking agent, or other such liquid.

Following rupture and release of the cross-linking agent, the fractured sections or residue of the ruptured capsule wall remain in the molded product. These fractured sections, which are believed to be fragments of spheres, have not been found to interfere with the provision of commercially acceptable surface appearance. Similarly, potential microcapsule (or agglomerated microcapsule) rupture at the surface has not been found to give rise to visual or physical surface defects. Contrarily, my encapsulation techniques have resulted in improved and more defect-free surfaces on the molded part.

As a result of the encapsulation and the vapor pressure release of the cross-linking agent, it is possible to monitor fairly precisely the time and release conditions of the cross-linking agent. This enables the manufacturer to determine exactly when in the manufacturing cycle to expose the silicone rubber components to the cross-linking agent. It is therefore not necessary to add an inhibitor which counters the reactivity of the first free radicals formed, or an accelerator which speeds the production of free radicals, in order to achieve cross-linking at the desired point in the mold cycle. Because cross-linking can be delayed until the products have entered the molding cycle, the manufacturer may increase the molding temperature by a significant amount. This subsequently reduces the mold cycle time. Higher temperatures are also believed to contribute to the increased degree of cure observed with the use of encapsulated cross-linking agents.

There are many other advantages which result from the use of my invention. Because the cross-linking agent does not interact with the elastomer until it is released from its capsule, there is very little precuring of the silicone rubber components in the stock. Similarly, there is a significant increase in the scorch safety or the inhibition of premature vulcanization. Vulcanization refers to cross-linking. The stock can be mixed for longer times, at higher temperatures, so that there is a more homogeneous mixture. Mold flow is excellent, so that the stock completely fills the mold and is otherwise readily molded. Because of the improvement in the scorch safety (or the reduction of the vulcanization at a premature point), the viscosity of the stock is improved. This allows for better flow into the mold, and also allows the products to be molded at a lower pressure, which in turn reduces the flash of the molded product.

The silicone rubber stock has a shelf life limited only by the shelf life of the independent ingredients, and not by some indefinite cure threshold determinable only by unsatisfactory use or costly inspection of the stock. The need for free radical curing inhibitors is eliminated. The cross-linking agent, fillers, and any other additives, are more evenly distributed throughout the stock because one can mix for longer times and at higher temperature.

Additional advantages may be obtained with the use of combinations of separately encapsulated, different cross-linking agents, as well as mixing different cross-linking agents in the same capsules. Also, less than all of the cross-linking agent may be encapsulated so as to allow precise control of the amount of cross-linking agent available for initial gel and viscosity build-up. Further, a non-encapsulated, cross-linking agent having a relatively low half-life temperature may be used to effect gel and viscosity build-up, and may be combined with an encapsulated cross-linking agent having a high half-life temperature to effect high temperature, and thus more complete cure, of the molded product.

The organic peroxides which may be encapsulated in accordance with my invention include any of the well known silicone rubber cross-linking agents, e.g., diacyl peroxide, peroxy esters, dialkyl peroxides, and peroxy ketals. Examples of frequently used peroxides are 2,5-dimethyl-2,5-di(tertiary butyls-peroxy)hexane (DBPH), dicumyl peroxide, benzoyl peroxide, $\alpha,\alpha$-bis(tertiary-butyl; peroxy)diisopropyl benzene, and bis(2,4-dichlorobenzoyl)peroxide. These organic peroxide cross-linking agents are free radical cross-linking agents.

The present invention follows known ratios of silicone rubber components and cross-linking agents. Likewise, the amount of filler used is also known in the art.

The preferred materials for encapsulating the cross-linking agents are phenol-formaldehyde resins. These resins have been found to be particularly suitable for encapsulating 2,5-dimethyl-2,5-di(tertiary butylperoxy)-hexane (DBPH). Other unsaturated thermoset resins may be used, such as polyester resins, ureaformaldehyde, and melamines. The encapsulating material should be inert, relatively brittle, and impervious to the cross-linking agent, so as to keep it separate from the silicone rubber components until it is released.

EXAMPLE 1

Comparative tests were made between a silicone rubber stock including an encapsulated cross-linking agent in accordance with this invention and an otherwise identical system incorporating the same cross-linking agent in a conventional manner without encapsulation. The silicone rubber component used was methyl-vinyl polysiloxane. The cross-linking agent used was 2,5-dimethyl-2,5-di(tertiary butyl peroxy)hexane (DBPH) at the strength of 0.45 grams active agent per 100 grams of polymer. The system included the following fillers in the following ratios:

titanium dioxide — $\frac{3\text{ grams}}{100\text{ grams}}$, filler/polymer iron oxide — $\frac{2\text{ grams}}{100\text{ grams}}$, filler/polymer -continued amorphous silica — $\frac{55 \text{ grams}}{100 \text{ grams}}$, filler/polymer In addition, fumed silica and amorphous silica were added to the methyl-vinyl polysiloxane by its manufacturer, as is customary.

The cross-linking agent was encapsulated in phenolic resin. The capsule size ranged from 10 to 50 microns.

| The following test conditions were observed. | |
|---|---|
| 1. mold temperature | 350° F. |
| 2. cure time | 5 minutes |
| 3. slow closing time | 5 seconds |
| 4. heat weight | 47.00 grams |
| 5. orifice in spiral mold | 1/16 inch |

As shown in Table I below, spiral weight tests were run at 500, 750, 1000, 1250, 1500, and 2000 psi, using both the regular silicone system and the silicone system modified in accordance with the present invention.

The spiral weight test is a variation on the standard test for flowability, the spiral flow test. The spiral flow test is used to determine increased flowability of the composites during molding. This test determines the flow properties of the molded stock or composite based on the distance it will flow along a spiral runner of constant cross section under controlled conditions of sample weight, pressure, and temperature. The test is performed with a transfer molding press and a test mold into which the composite material is fed at the center of the spiral cavity. (See "Whittington's Dictionary of Plastics," Loyd R. Whittington, Technomic Publishing Co., Inc., Stanford, Conn. 1968.) Customarily, the length of the resultant product is taken as an indication of how much composite flowed into the mold during molding. It was found, however, that for an elastic product such as the silicone rubber, the weight (or "spiral weight") of the product is a more accurate indication of product flow during molding. An increase in the spiral weight shows an increase in the flowability of the composite.

The spiral weight was measured for both stocks and the percentage gain in weight of the modified stock in accordance with the present invention was calculated for each pressure.

TABLE 1

| Pressure (PSI) | Regular Stock (g) | Encapsulated Stock (g) | % Gain |
|---|---|---|---|
| 500 | 5.932 | 7.046 | +18.78 |
| 750 | 7.740 | 8.379 | +8.26 |
| 1,000 | 7.778 | 8.565 | +10.12 |
| 1,250 | 7.896 | 8.582 | +8.69 |
| 1,500 | 7.967 | 8.651 | +8.59 |
| 2,000 | 8.993 | 9.127 | +1.49 |

This information is set forth in graph form in FIG. 1. Curve 1 shows the results of the test for the regular stock and curve 2 shows the results for the stock with encapsulated cross-linking agent.

As is illustrated in Table 1 and FIG. 1, both stocks followed the same pattern of a large increase of spiral weight at low pressures, followed by leveling out as the pressures increased; however, there was a consistent gain of over 8% of the product modified in accordance with the present invention for between 750 psi and 1500 psi. A gain of over 18% of the spiral weight for the modified stock was realized at 500 psi.

The differences in the test values are believed to result from the delay of the cross-linking reaction by encapsulation of the cross-linking agent. The encapsulated cross-linking agent remains isolated, and thus cross-linking does not occur until after the capsule ruptures at the proper rupture temperature, causing the cross-linking agent to be released. In contrast therewith, the non-encapsulated cross-linking agent induces preliminary cross-linking sufficient to impede the flowability of the silicone rubber compound.

The invention presents the advantage of allowing the manufacturer to transfer or inject the components at lower pressures and still fill out the parts. This is demonstrated by the consistently higher spiral weight values for the encapsulated cross-linking agent stock than the regular stock at similar pressures (see FIG. 1). It also results in less flash or excess materials accumulating at the mold boundaries.

Figure 2:
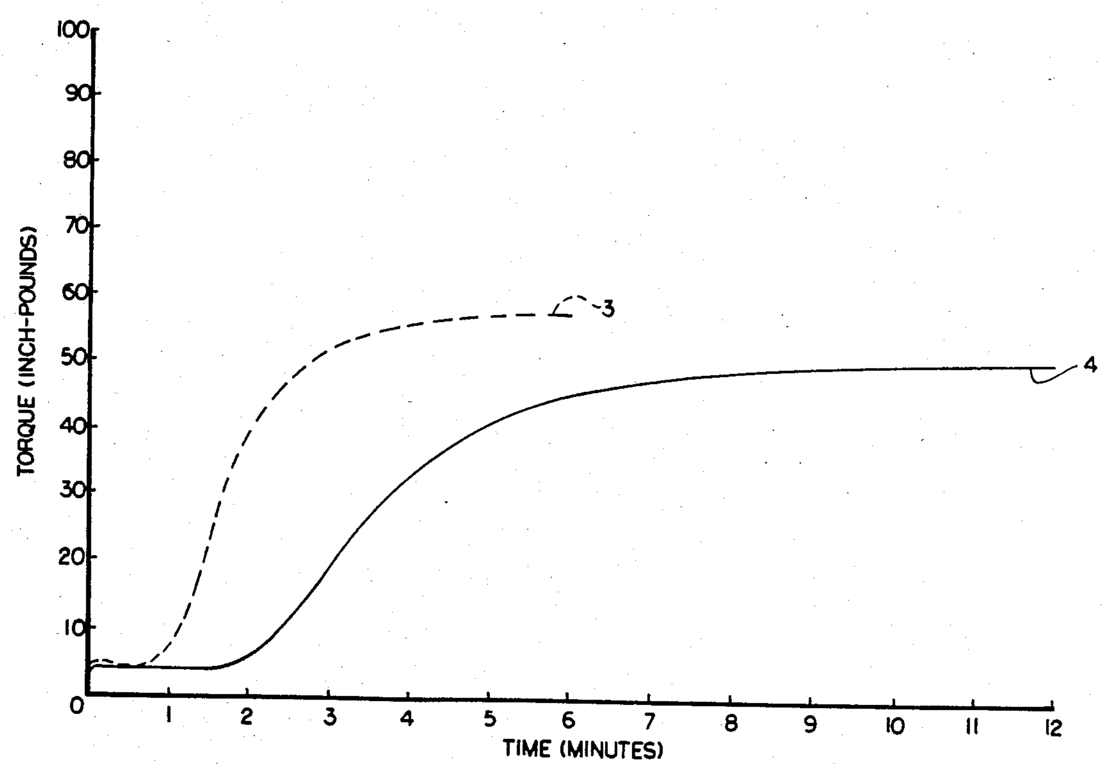
FIG. 2 is a rheograph comparing the molded silicone rubber composite, with and without encapsulated cross-linking agent.

FIG. 2 shows the result of the rheograph tests for a product made from regular stock (curve 3) and for a product made in accordance with the present invention (curve 4) for the same products as used in Example 1. A rheograph presents an indication of cure by showing the torque versus the time. This illustrates a slower rate of initial cure for the modified stock, which results in less scorch or premature vulcanization of the silicone rubber components.

EXAMPLE 2

Tests were run to determine the effect of mold temperatures for use with the products. The same silicone rubber stock (with encapsulated cross-linking agent) as was used in Example 1 was tested. Example 1 compared the flowability of the system with and without encapsulated cross-linking agent at 350° F. mold temperature with all the other test characteristics being the same as for this test.

The following test conditions were held constant:

| | |
|---|---|
| 1. cure time | 5 minutes |
| 2. slow closing time | 5 seconds |
| 3. heat weight | 47 grams |
| 4. orifice in spiral mold | 1/16 inch |

The silicone elastomer system used was methylvinyl polysiloxane elastomer and DBPH cross-linking agent at the strength of 0.45 grams per 100 grams of resultant polymer, with titanium dioxide, iron oxide, and amorphous silica fillers.

The encapsulation material was phenolic resin. The capsule size was 10–50 microns.

In addition, the mold was mounted in the press so that it would automatically open and close. This eliminated variations due to operator problems opening the mold and resulting heat loss. Three sets of tests were run:

The flowability as indicated by spiral weight is compared in Tests A, B, and C below at respective mold temperatures of 315° F., 330° F., and 345° F. The line pressure was varied from 500 psi to 2500 psi in 250-psi increments at each test temperature. The results of these tests are summarized in Table 2.

Once again the flowability was determined using the spiral weight test. The results of these tests are summarized in Table 2.

TABLE 2

| Line Pressure (psi) | Spiral Weight (g) | Pad and Gate Weight (g) | Total Weight (g) |
|---|---|---|---|
| | Test A - 315° F. | | |
| 500 | 2.80 | 43.50 | 46.30 |
| 750 | 4.40 | 42.35 | 46.75 |
| 1,000 | 5.60 | 38.80 | 44.40 |
| 1,250 | 7.00 | 37.70 | 44.70 |
| 1,500 | 7.70 | 36.50 | 44.20 |
| 1,750 | 8.05 | 34.60 | 42.65 |
| 2,000 | 8.40 | 34.15 | 42.55 |
| 2,250 | 8.70 | 33.90 | 42.60 |
| 2,500 | 8.90 | 32.75 | 41.65 |
| | Test B - 330° F. | | |
| 500 | 3.25 | 43.60 | 46.85 |
| 750 | 3.95 | 42.45 | 46.40 |
| 1,000 | 4.80 | 41.50 | 46.30 |
| 1,250 | 5.20 | 40.30 | 45.50 |
| 1,500 | 6.00 | 38.55 | 44.55 |
| 1,750 | 6.55 | 37.20 | 43.75 |
| 2,000 | 7.30 | 35.35 | 42.65 |
| 2,250 | 7.40 | 34.75 | 42.15 |
| 2,500 | 7.30 | 35.00 | 42.30 |
| | Test C - 345° F. | | |
| 500 | 2.65 | 43.65 | 46.30 |
| 750 | 3.60 | 42.80 | 46.40 |
| 1,000 | 4.55 | 41.10 | 45.65 |
| 1,250 | 5.20 | 40.40 | 45.60 |
| 1,500 | 5.85 | 38.40 | 44.25 |
| 1,750 | 6.35 | 37.95 | 44.30 |
| 2,000 | 6.85 | 37.30 | 44.15 |
| 2,250 | 7.35 | 36.00 | 43.35 |
| 2,500 | 7.30 | 35.50 | 42.80 |

Figure 3:
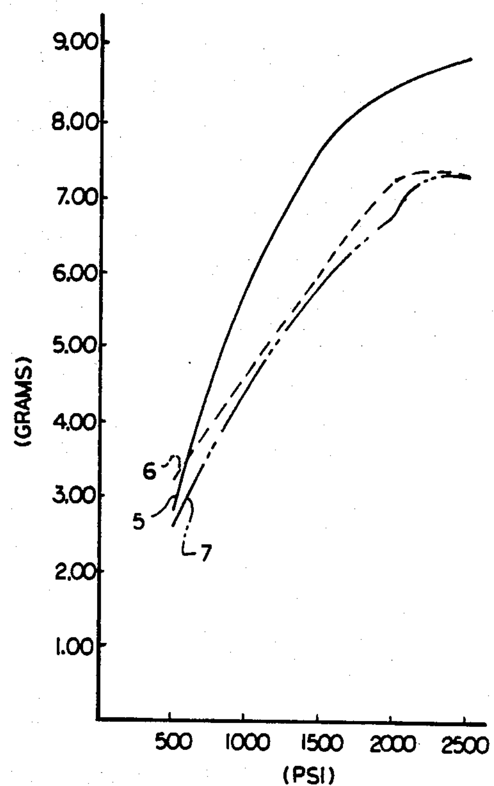
FIG. 3 is a graph showing spiral weight gain versus the injection pressure of the molded rubber composite with encapsulated cross-linking agent at three different temperatures.

FIG. 3 is a graph illustrating the spiral weights in tests A (curve 5), B (curve 6), and C (curve 7). Tests B and C (curves 6 and 7) show similar flow behavior, as FIG. 3 demonstrates. However, Test A (curve 5) has a steeper flow curve. The difference in behavior between Test A (curve 5) and Tests B and C (curves 6 and 7) is due to the temperature difference. Tests B and C (curves 6 and 7) were run above the temperature necessary to burst the capsules. Test A (curve 5) shows the steepest increase in the spiral weight versus the molding pressure. This increase in weight is due in part to the increase in molding material, but as well to unevaporated or unreacted (i.e., unruptured capsules) cross-linking agent. Thus, Test A (curve 5) shows that the silicone rubber composite is not satisfactorily cured at 315° F. This is a borderline temperature for this silicone rubber stock. Tests B and C (curves 6 and 7) show that the temperature does not play a major role once curing temperature has been reached. These tests demonstrate that the mold temperature should be set at the proper vulcanization temperature, and pressure should range from 500 psi to 2000 psi, which conforms to the more linear relationships shown in the curves in FIG. 3. Above 2000 psi, there appears to be a leveling off of readings.

EXAMPLE 3

Physical property tests were run on products of silicone rubber stock, one of which was modified in accordance with the present invention. The same silicone rubber stock was used as in Examples 1 and 2. The molding temperature was 350° F. Tests preformed were original tensile, elongation, and durometer hardness on each, as well as compression set tests under the approved ASTM conditions for this class of material. These results are shown in Table 3 below.

TABLE 3

| | Regular | Encapsulated |
|---|---|---|
| Durometer (Shore A) | 59 | 58 |
| Tensile (psi) | 633 | 650 |
| Elongation (%) | 330 | 410 |
| % Compression Set 22 hours 25% Deflection | 17.6 | 19.2 |

The product produced using the modified stock with encapsulated cross-linking agent shows somewhat greater elongation and higher compression set. There also appears to be a higher tensile strength, while the results of the durometer hardness showed no significant difference.

The modified stock demonstrates improved tensile elongation and compression set characteristics (including a 24% increase in elongation). However, the products are sufficiently similar to suggest that the new stock can be used interchangeably with the known stock.

The silicone rubber stock modified in accordance with the present invention demonstrates significant improvement in scorch safety or inhibition of premature vulcanization, improved flowability, and fewer flash problems. It also has the improved physical characteristics noted above.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A process for the manufacture of a molded silicone rubber product comprising the steps of:

(a) forming a substantially uniform mixture comprising room temperature vulcanizing or heat curing silicone rubber components and a liquid phase including an organic peroxide cross-linking agent encapsulated within an encapsulating material to form microcapsules, the microcapsules being impervious to the cross-linking agent and having a wall thickness and a rupture strength designed to withstand external agitation, but to rupture when the internal vapor pressure reaches a rupture point;

(b) maintaining substantially all of said cross-linking agent in the microcapsules isolated from said silicone rubber components until the temperature and pressure are such that the cross-linking agent is released from the microcapsules;

(c) performing a molding cycle having a first and second portion, (i) the first portion being a flowing step comprising flowing the mixture to fill a mold cavity with the mixture prior to any significant cross-linking agent induced cross-linking, (ii) the second portion being a cross-linking step comprising raising the temperature of the mixture within the mold cavity to raise the vapor pressure within the microcapsules to the rupture point to cause the microcapsules to rupture, and to release the organic peroxide cross-linking agent, substantially all cross-linking occurring during the second portion of the molding cycle; and (d) removing the cured mixture from the mold cavity to provide the silicone rubber product.

2. The process of claim 1, wherein said forming step comprises the steps of:

(a) encapsulating an organic peroxide cross-linking agent in an encapsulating material to form impervious microcapsules containing a liquid phase;

(b) combining said microcapsules with the silicone rubber components; and (c) providing a period of mechanical agitation to produce a substantially uniform integration of said mixture.

3. The process of claim 1, wherein the flowing step of the molding cycle is accomplished at lower pressures and at higher mold temperatures compared with the flowing step of the molding cycle of a mixture to form a silicone rubber product containing cross-linking agent in a nonencapsulated form.

4. The process of claim 1, wherein the rupture point is reached at a pressure from about 500 to 2500 psi, and at a temperature from about 250° F. to 360° F.

5. The process of claim 1, wherein the rupture point of said microcapsules approaches a temperature within about 30 degrees of the vulcanization temperature of said mixture.

6. A process for the manufacture of a molded silicone rubber product according to claim 1, wherein step (a) provides a mixture which is free of accelerators, promoters, or inhibitors.

7. A composition for the manufacture of a molded product comprising a substantially uniform blend of (a) silicone rubber components chosen from the group of silane or siloxane monomers, oligomers, or polymers;

(b) rigid microcapsules formed of an encapsulating material ranging from 10 to 50 microns in size and containing a liquid phase organic peroxide cross-linking agent, said microcapsules being impervious to the cross-linking agent, and having a wall thickness and a rupture strength designed to withstand external agitation but to rupture when an internal vapor pressure reaches a rupture point, said rupture point being reached at a pressure from about 500 to about 2500 psi, and at a temperature from about 250° F. to about 360° F.

8. A composite as set forth in claim 7, wherein the cross-linking agent is encapsulated in a phenolic resin.

9. A composite as set forth in claim 7, including one or more additives chosen from the group consisting of promoters, thickening agents, colorants, reinforcing agents, and fillers.

* * * * *